United States Patent [19]

Waring

[11] Patent Number: 4,966,312

[45] Date of Patent: Oct. 30, 1990

[54] DISPOSABLE ORAL LIQUID MEASURE DISPENSER

[76] Inventor: Donald A. Waring, 17997 Oak Leaf La., Yorba Linda, Calif. 92686

[21] Appl. No.: 280,672

[22] Filed: Dec. 6, 1988

[51] Int. Cl.⁵ .................... A61J 7/00; A61M 5/178; B65D 37/00; B67D 5/38

[52] U.S. Cl. .................... 222/209; 222/158; 222/210; 222/211; 222/212; 222/215; 222/541; 604/77; 604/216

[58] Field of Search ............... 222/155, 158, 159, 206, 222/207, 209, 210, 211, 212, 215, 188, 541, 454, 456, 464; 128/360; 604/212, 216, 207, 77

[56] References Cited

U.S. PATENT DOCUMENTS

| | | | |
|---|---|---|---|
| 98,177 | 12/1869 | Matthews, Jr. | 222/209 X |
| 754,132 | 3/1904 | Fulton | 222/209 X |
| 762,299 | 6/1904 | Fulton | 222/209 X |
| 2,353,153 | 7/1944 | Ferrel | 222/158 X |
| 3,157,319 | 11/1964 | Schwienbacher | 222/207 |
| 3,178,081 | 4/1965 | Adams . | |
| 3,266,532 | 8/1966 | Stewart | 222/209 X |
| 3,323,689 | 6/1967 | Elmore . | |
| 3,347,401 | 10/1967 | Nataf | 222/211 X |
| 3,351,241 | 11/1967 | Wood . | |
| 3,398,427 | 8/1968 | John | 425/149 |
| 3,572,337 | 3/1971 | Schunk | 604/77 |
| 3,651,995 | 3/1972 | Chaney | 222/211 |
| 4,214,679 | 7/1980 | Whang . | |
| 4,324,349 | 4/1982 | Kaufman | 222/207 |
| 4,411,656 | 10/1983 | Cornett, III | 604/212 |
| 4,516,697 | 5/1985 | Dreps et al. | 222/207 X |
| 4,596,343 | 6/1986 | Ford . | |
| 4,600,130 | 7/1986 | Libit | 222/464 X |
| 4,640,441 | 2/1987 | Bunschoten | 222/207 |
| 4,640,442 | 2/1987 | Drobish . | |
| 4,645,097 | 2/1987 | Kaufman | 222/211 X |

Primary Examiner—Kevin P. Shaver
Attorney, Agent, or Firm—William L. Chapin

[57] ABSTRACT

A disposable oral liquid measure/dispenser for administering measured, pre-packaged dosages of liquid medication or food to human or animal patients comprises a one-piece structure made of a flexible thermoplastic, preferably by blow-molding. The container/dispenser has an upper cylindrical neck section for filling with liquid and sealable with a tamper-evident seal. A flexible bellows section extending downwards from the neck section joins a central fluid reservoir section, which is in turn joined at its lower end to a dispensing tube shaped like an inverted U-tube. The outer, outlet leg of the dispensing tube has a cap which is serverable by a scissors when it is desired to dispense the contents. Pushing downward on the upper surface of the sealing cap collapses the bellows, pressurizing the fluid storage reservoir section of the container. This in turn forces fluid upwards into the inner, inlet leg of the dispenser tube, and out the outlet leg into a patient's mouth.

12 Claims, 2 Drawing Sheets

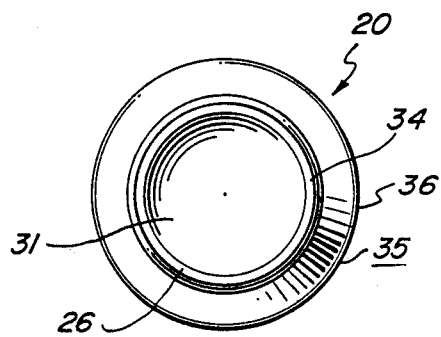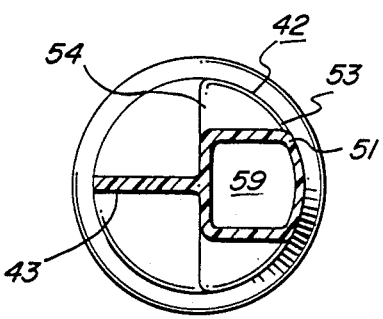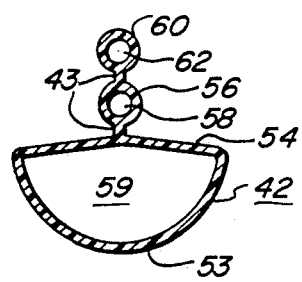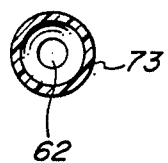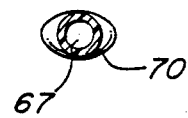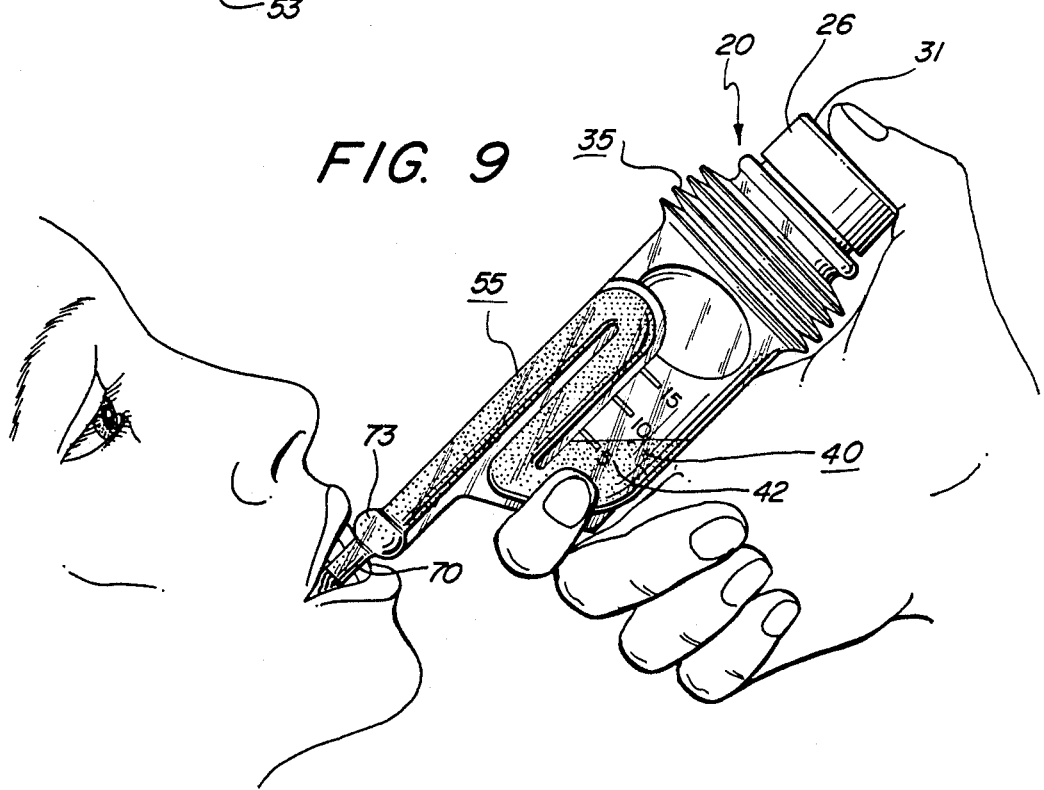

DISPOSABLE ORAL LIQUID MEASURE DISPENSER

BACKGROUND OF THE INVENTION

1. Field of the Invention

This invention relates to containers for dispensing fluid or semi-fluid medications or foods to humans or animals. More particularly, the invention relates to a disposable dispensing container capable of positively injecting a pre-measured dosage of liquid into the mouth of a patient.

2. Description of Background Art

Nursing homes, hospitals and similar institutions have a continuing need for the periodic administration of liquid medications and/or food supplements to a substantial percentage of the patients residing there. One traditional way of dispensing such liquids to patients requires the steps of having a nurse or other health care employee consult the patient's chart to determine the required dosage, pour a measured amount of the medication from a bulk container into a separate dispensing means such as a spoon, and transfer the liquid from the dispensing means to the patient's mouth. The procedure described above is simple enough, yet has certain disadvantages. For example, the bulk supplies of medication must be transferred to the vicinity of the patient, and errors in filling the dispensing means and administering the contents of the dispensing means to the patient can be, and frequently are made when the dosage is prepared at the patient's bedside. The procedure also requires the use of a separate disposable or sterilizable spoon or other such dispensing means for each dosage administered.

To alleviate some of the potential problems of incorrect dosages being administered to patients, some nursing homes, hospitals and similar institutions have adopted a somewhat more reliable procedure for administering liquid medications to patients. For example, some institutions employ a pharmacist to prepare a pre-measured unit dosage of medication for each patient, placing each unit dosage in an individual container. The container is marked with information identifying the patient and contents and additional information as required. To ensure the integrity of the type and quantity of medication which is ultimately administered to a patient, the individual containers must be sealed with a tamper-proof or tamper-evident seal. Thus, previously existing unit dosage packaging methods often required special, expensive sealing equipment. The cost of such equipment was not readily amortizable by smaller nursing homes and similar institutions of limited resources, and therefore has not been used as extensively as might be desirable from both the patient's standpoint and that of the health care facility. Also, the use of conventional unit dosage packages still requires the use of a separate dispensing means such as a disposable spoon, thus adding the cost of maintaining an inventory of dispensing means, and disposing of them after use, to the other costs associated with dispensing medication.

A variety of dispensers capable of dispensing a measured amount of liquid have been proposed, some of them intended for dispensing medicines. The latter include those disclosed in the following U.S. patents:
Wood, 3,351,241, Nov. 7, 1967, Medicine Dispenser
Whang, 4,214,679, July 29, 1980, Measured Quantity Dispenser Metering liquid dispensing devices intended for non-medicinal applications are disclosed in the following U.S. patent:
Adams, 3,178,081, Apr. 13, 1965, Metering Liquid Dispensing Device Dispensing containers employing pressurization of the container are disclosed in the following U.S. patents:
Elmore, 3,323,689, June 6, 1967, Dispensing Bottle
Ford, 4,596,343, June 24, 1986, Foam Dispensing Device
Libit, 4,600,130, July 15, 1986, Squeeze Pressure Dispenser With Integral Siphon Tube
Drobish, 4,640,442, Feb. 3, 1987, Dispensing Package And Follower Device All of the prior art dispensers which the present inventor is familiar with, including those disclosed above, have one or more inherent limitations which limit their applicability to the problem of providing an effective unit dosage system for nursing homes and similar institutions. Thus, prior dispensing containers have required multiple components, must be tilted in particular orientations for filling and dispensing, require multi-element pump mechanisms, or are not suited for dispensing liquids to patients. In view of the desirability of having an effective unit dosage oral liquid measure/dispenser, and of the limitations of existing related devices, the present invention was conceived.

OBJECTS OF THE INVENTION

An object of the present invention is to provide a disposable container for containing and dispensing a precise amount of liquid to a human or animal patient.

Another object of the invention is to provide a disposable oral liquid measure/dispenser which is capable of delivering a precise volume of fluid or semi-fluid medicine or food directly into the mouth of a human or animal patient.

Another object of the invention is to provide a disposable oral liquid measure/dispenser which may be readily used by the patient himself.

Another object of the invention is to provide a disposable oral liquid measure/dispenser which remains securely sealed until use, and which provides a positive indication of any possible tampering with the contents of the device.

Another object of the invention is to provide a disposable oral liquid measure/dispenser which when opened for dispensing, retains the contents securely within the dispenser until it is desired to dispense the contents.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferrable from the embodiments of the invention described herein be included within the scope of the invention as defined by the appended claims.

SUMMARY OF THE INVENTION

Briefly stated, the present invention comprehends a disposable container which may be filled with a precise volume of fluid medication or food, sealed to prevent tampering with the fluid contents, transported to a human or animal patient, and used to inject a measured volume of fluid into the mouth of the patient.

The disposable oral liquid measure/dispenser according to the present invention comprises an elongated container made of a flexible plastic material. The container has a cylindrical neck section having an upper opening or mouth through which the container may be filled, and subsequently sealed with a tamper-proof or tamper-evident cap. Intermediate the cylindrical neck section and main fluid storage section of the container is an elongated bellows section having a plurality of alternating annular flanges and constrictions formed in a thin cylindrical wall. The bellows section is joined at its lower end to a semi-cylindrical reservoir section, which is in turn joined at its lower end in a fluid-tight connection to the inner leg of an inverted hollow U-shaped dispensing tube. The outer, outlet leg of the dispensing tube has at its lower end an oval cross-sectional shape, and a constricted diameter or necked down section.

To use the disposable oral liquid measure/dispenser according to the present invention, the pre-filled and sealed container is transported to the patient, and the sealed tip of the dispensing tube below the constricted neck portion of the dispensing tube is severed and removed by cutting completely through the neck with a scissors or knife. The container is then transported in an upright position to the patient's mouth, and the open end of the dispensing tube inserted between the teeth. During this step, fluid is prevented from dripping out of the orifice formed by cutting the dispensing tube, by the inverted U-shape of the dispensing tube, which thus forms a trap. With the dispensing tube in place between the teeth of the patient, the upper surface of the cap is pressed down using thumb pressure, collapsing the bellows section to a small fraction of its intitial, extended volume. This volume reduction pressurizes the interior of the container, forcing liquid upwards in the inner leg of the U-shaped dispensing tube and downwards and out through the outer, outlet leg of the dispensing tube and into the patient's mouth. If the total volume of fluid to be given is not completely dispensed upon the first compression of the bellows section, the bellows section is allowed to elastically reassume its initial, extended position, and then collapsed again. This cyclical process may be repeated as many times as are required to deliver the complete dosage to the patient.

BRIEF DESCRIPTION OF THE DRAWINGS

FIG. 4 is an upper plan view of the dispenser of FIG. 3.

FIG. 5 is a transverse sectional view of the dispenser of FIG. 1, taken along line 5—5.

FIG. 6 is a transverse sectional view of the dispenser of FIG. 3, taken along line 6—6.

FIG. 7 is a transverse sectional view of the dispenser of FIG. 3, taken along line 7—7.

FIG. 8 is a transverse sectional view of the dispenser of FIG. 3, taken along line 8—8.

FIG. 9 is a perspective view of the dispenser of FIG. 1, showing the dispenser being used to administer medication to a patient.

DETAILED DESCRIPTION OF THE INVENTION

Referring now to FIGS. 1 through 9, a novel disposable oral liquid measure/dispenser according to the present invention is shown. The measure/dispenser according to the present invention provides a highly effective means for accomplishing its intended function, namely, to securely store, transport, and inject a precise unit dosage of liquid medication into the mouth of a patient.

The movel disposable oral liquid measure/dispenser 20 according to the present invention and shown in FIGS. 1 through 9 comprises essentially a unitary hollow body structure which is preferably blow molded from a strong, flexible sterilizable plastic such as a polypropylene/polyethylene co-polymer. A concave cap is used to seal the body structure after it is filled with liquid.

As may be seen best by referring to FIGS. 1 through 4, the body 21 of the disposable oral liquid measure/dispenser 20 has a generally cylindrically shaped, relatively short upper neck section 22 having an open upper filling mouth 23.

Figure 3:
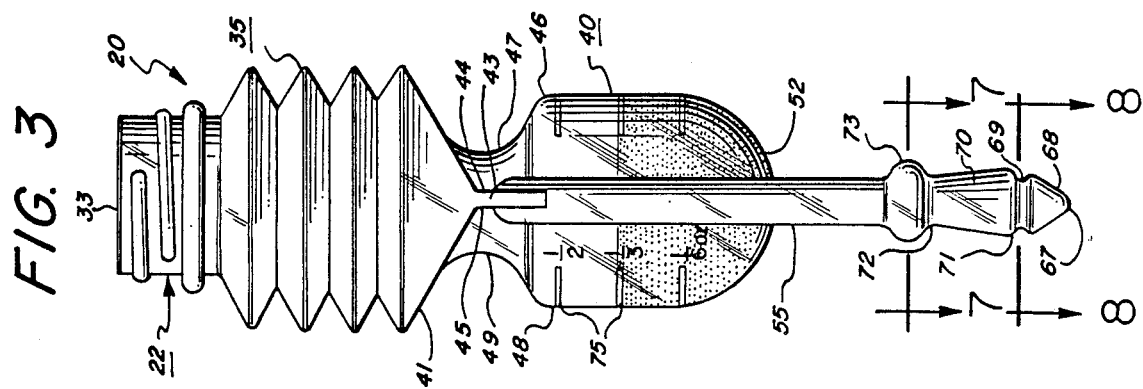
FIG. 3 is a fragmentary left end elevation view of the dispenser of FIG. 1, showing the sealing cap removed.
Figure 1:
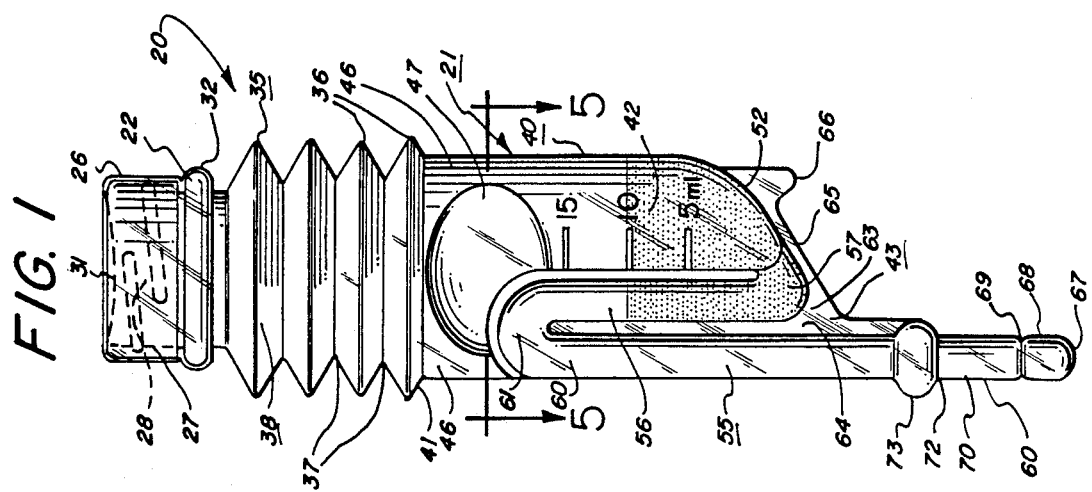
FIG. 1 is a front elevation view of a disposable oral liquid measure/dispenser according to the present invention.

As shown in FIG. 3, the outer cylindrical surface 24 of neck section 22 may contain external helical threads 25 which adapt the neck section to receive a concave cap 26 having on its inner cylindrical surface 27 mating threads 28. Alternatively, as shown in FIG. 1 the outer surface 24 of neck section 22 may be smooth, and adapted to receive a concave cap 29 having a smooth inner surface and adapted to being ultrasonically bonded to the outer surface of the neck section. Threaded cap 26 and smooth cap 29 are both provided in their upper circular wall with a concave thumb depression 30 and 31, respectively, the purpose of which will be described below.

Whether threaded cap 26 or smooth cap 29 is used to seal filling mouth 23 of neck 22, the cap is preferably sealed after filling with a tamper-evident seal. For example, a plastic shrink band 32, as shown in FIG. 1 may be employed as the tamper-evident seal. In an alternative tamper-evident seal construction a metal foil laminate disc 33 may be sealed by induction heating to the upper transverse annular wall 34 of neck section 22, as shown in FIGS. 3 and 4.

Extending coaxially downwards from the upper neck section 22 of dispenser 20 is an elongated bellows section 35. The bellows section 35 is an extension of the upper neck section, both sections being formed coextensively by blow molding from a single hollow plastic preform.

The bellows section 35 comprises a plurality of radially outwardly extending annular rings of flanges 36 spaced apart at regular longitudinal intervals, interspersed alternately with radially inwardly extending annular constrictions 37.

The bellows section 35 has an elongated, generally cylindrically shaped hollow interior space 38 communicating at its upper end with the hollow interior space 39 of upper neck section 22.

The bellows section 35 is joined at its lower end to a central reservoir section 40. As may be seen best by referring to FIGS. 1, 2 and 5, the radially inwardly directed lower annular wall surface 41 of the lowermost of the bellows rings of flanges 36 terminates on the right side of the dispenser 20 in a semi-cylindrical section 42. As may be seen best by referring to FIGS. 1, 3 and 5, the annular wall surface 44 of the lowermost of the bellows flanges on the left side of the dispenser 20 extends radially inwards a substantially greater distance than on the right side, to terminate in a relatively thin, longitudinally disposed web 43. The front side wall 44 of web 43 and rear side 45 of the web are in parallel vertical planes and are spaced a common distance from the longitudinal center plane of the dispenser which separates the dispenser into front and rear halves.

As may be seen best by referring to FIGS. 1, 2, and 3, the front wall 46 of reservoir section 40 has a concave depression 47 formed in the wall just below the intersection of the front wall with the lowermost of the radially inwardly directed lower annular wall surfaces 41 of bellows flanges 36. As shown in FIG. 1, the concave depression 47 has in plan view the shape of an elliptical or oval curve whose major axis is oriented perpendicularly to the longitudinal axis of the body 21 of measure/dispenser 20.

As can be inferred from FIGS. 3 and 5, the body 21 of measure/dispenser 20 is exactly mirror symmetric about a longitudinal sectional plane dividing the body into front and rear halves. Thus, the rear wall 48 of reservoir section 40 has a concave depression 49 formed in the wall which is axially aligned with depression 47 in front wall 46, and which is its mirror image. Depressions 47 and 49 are provided to facilitate filling and manipulating measure/dispenser 20, as will be described later.

As may be seen best by referring to FIGS. 1 through 6, the fluid storage section 42 of central reservoir section 40 is generally semi-cylindrically shaped. The upper portion 51 of the fluid storage section 42 is modified by the concave indention 47 and 49 in the front wall 46 and rear wall 48, respectively of reservoir section 40. Thus, the upper portion 51 of the fluid storage section 42 has a generally rectangular transverse cross-sectional shape, as may be seen best by referring to FIG. 5.

Figure 2:
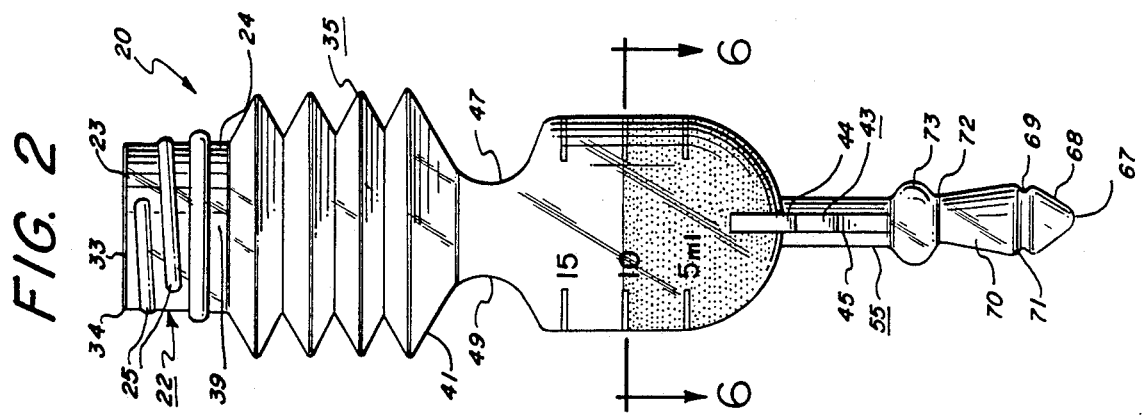
FIG. 2 is a right end elevation view of the dispenser of FIG. 1.

As shown in FIGS. 1 through 3, the bottom wall 52 of fluid storage section 42 has a generally hemispherical, convex shape, the front and rear symmetrical halves of which join the front and rear side walls 44 and 45, respectively, of web 43.

As may be seen best by referring to FIGS. 1 and 5, the right side wall 53 of central reservoir section 40, fluid storage section 42 and body 21 of disposable oral liquid measure/dispenser 20 are all coextensive. The right side wall 53 has the general shape of a longitudinally elongated semi-cylinder. The left side wall 54 of fluid storage section 42 has the general shape of a longitudinally elongated, flat chordal plane which in combination with the convex semi-cylindrical right side wall 53 of the fluid storage section forms a semi-cylinder.

Referring again primarily to FIGS. 1 through 3 and 6, the liquid measure/dispenser 20 is seen to include a hollow dispenser tube section 55 having the general shape of an inverted U-tube which has a transverse cross-sectional shape and a coaxial bore. The dispenser tube section 55 has an elongated inner leg or inlet tube section 56 which is straight and longitudinally disposed with respect to the body 21 of the measure/dispenser 20.

The inner leg 56, as well as the remaining portions of dispenser tube 55, are mirror symmetric about a longitudinal symmetry plane separating the body 21 into front and rear halves, as may be seen best by referring to FIG. 3.

The bottom portion of inner leg 56 has a short end section 57 which curves upwards arcuately to join the bottom convex wall of fluid storage section 42. Inner leg 56 has a bore 58 which communicates sealingly with the hollow interior space 59 of fluid storage section 42.

The dispenser tube section 55 also has an elongated outer leg 60. Outlet tube section 60 is generally straight and longitudinally disposed with respect to the body 21 of the measure/dispenser 20. The transverse cross-sectional shapes of inlet tube section 56 and outlet tube section 60 are generally circular. The left cylindrical wall surface of the outlet tube section 60 is coextensive with the left wall surface of body 21.

As may be seen best by referring to FIG. 1, the upper portion of outer leg 60 of dispenser tube section 55 has a short end section 61 which curves inwards arcuately to conformally join the upper end of inlet tube section 56. Outlet tube section 60 has a bore 62 which communicates sealingly with, and is axially coextensive with the bore 58 of inlet tube section 56.

As may be seen best by referring to FIGS. 1, 3, and 6, the dispenser tube section 55 is structurally joined to body 21 by means of the thin web 43 of generally uniform thickness having parallel, vertical front and rear side walls 44 and 45, respectively. As shown in FIG. 1 the web 43 has an inverted J-shaped leg section 63. The inner, straight portion of the inverted J-shaped leg 63 joins the cylindrical wall surface of inner leg 56 of dispenser tube section 55 to left side wall 54 of fluid storage section 41. The curved, upper portion of the inverted J-shaped leg 63 joins the upper surface of curved upper section 61 of outlet tube 60 to the bottom flange 41 of bellows section 35.

As may be seen best by referring to FIG. 1, the lower portion of web 43 has a longitudinally upwardly protruding finger 64 which joins the facing outer cylindrical wall surfaces of inner leg 56 and outer leg 60 of dispenser tube section 55. The bottom edge wall 65 of web 53 slopes upward toward the right side of body 21. Slightly to the left of the right side of body 21, the bottom edge wall dips downwards and then upwards to form a downwardly protruding tab or trigger grip 66, the purpose of which will be described later.

Referring now to FIGS. 1, 3, 7, and 8, the shape of outlet tube section 60 of dispenser tube section 55 is seen to have a number of structural departures from the shape of a simple vertically elongated hollow cylindrical tube. These structural modifications will now be described.

As shown in FIGS. 1, 3, and 8, the bottom end of outer leg 60 of dispenser tube section 55 is sealed by convex integrally formed, snip-off cap 67. The upper annular wall surface 68 of snip-off cap 67 curves inwards to terminate in a smaller diameter annular groove 69 in the wall of outlet tube section 60. As shown in FIG. 8, the wall of outer leg 60 curves outward above annular groove 69 to a larger diameter oval transverse cross-section segment 70 having a shoulder 71. Above shoulder 71, segment 70 tapers down to a smaller diameter, circular cross-section neck 72. The cylindrical outer wall of outlet tube section 60 is formed into a relatively short, enlarged diameter annular bead 73 just above neck 72.

To use the disposable oral liquid measure/dispenser 20, the prefilled and sealed dispenser is transported to the vicinity of the patient. There scissors are used to snip off cap 67 of outlet tube section 60, the oval outer cross-sectional shape of annular groove 69 facilitating placement of the scissors blades in a proper position to cleanly sever the cap from the outlet tube. During this and subsequent steps in dispensing fluid from the dispenser 20, the body 21 of the dispenser may be conveniently and securely grasped by placing the thumb and index finger in concave depressions 47 and 49 in the body.

The dispenser 20 is then transported to the vicinity of the patient's mouth, holding the dispenser as described above. Alternatively, as shown in FIG. 9, the index finger may be hooked around the sloping bottom edge wall 65 of web 43, the finger being prevented from slipping off of the sloping wall by contact with tab or trigger grip 66. Use of the trigger grip 66 is particularly desirable when medicine is self-administered.

The lower end of outlet tube section 60 of dispenser tube section 55 is then inserted into the patient's mouth. The enlarged diameter bead 73 forms a convenient stop for limiting the insertion distance of the tube between the upper and lower teeth of the patient. Also, the oval cross-sectional shape of the lower end of the tube 70 below the bead 73 provides a more comfortable and convenient gripping surface for the patient's teeth than would a circular cross-section tube.

With the outlet tube section 60 inserted into the patient's mouth as described above, the thumb or a finger may be used to press down on cap section 26 of the dispenser, collapsing bellows section 35 of the dispenser, as shown in FIG. 9. Bellows section 35 has an internal volume when extending at least twice as great as the fluid storage capacity of the dispenser 20. When collapsed, the volume of bellows section 35 is reduced to approximately 20% of its extended volume. Thus, when the bellows is compressed, sufficient pressure is created within the hollow interior space of the dispenser to positively expel the entire contents of the dispenser into the mouth of the patient.

As shown in FIG. 1, the front surface of body 21 of dispenser 20 has inscribed metric graduations 74, indicating fluid level within the dispenser in milliter units. As shown in FIGS. 2 and 3, the rear surface of body 21 of dispenser 20 has inscribed British unit graduations 75, indicating fluid level within the dispenser in fluid ounce units. The material of which dispenser 20 is made is translucent or semi-transparent, permitting the fluid level within the dispenser to be viewed. Thus the graduations 74 and 75 provide a convenient means for administering measured amounts of liquid, which amounts may be less that the capacity of the dispenser 20.

What is claimed is:

1. A one-piece dispensing container for transporting and dispensing through a bottom wall of said dispensing container, a measured amount of liquid or semiliquid, without dripping, said dispensing container being symmetrically shaped about a first longitudinally disposed medial plane and comprising:

(a) a generally cylindrically shaped, hollow upper neck section having an upper mouth opening adapted to receive liquid contents and to receive a cap sealable to said neck section, (b) a generally cylindrically shaped, hollow bellows section extending downwards from said neck section, said bellows section being formed of a flexible material and having formed in its cylindrical wall surface a plurality of annular rings disposed at regular longitudinal intervals, and a plurality of annular indentations disposed at regular longitudinal intervals alternating with said annular rings, (c) an elongated hollow reservoir section extending downwards from a bottom ring of said bellows section, at least a lower portion of said reservoir section being generally semi-cylindrically shaped, an outer side wall of said reservoir section being substantially longitudinally aligned with the outer annular wall of said bottom ring of said bellows section, the inner side wall of said reservoir section being located proximate a second longitudinally disposed medial plane perpendicular to said first medial plane, the front and rear side walls of an upper portion of said reservoir connected to the inner and outer walls and defining a front-to-rear thickness dimension of said reservoir section upper portion of said reservoir section, said dimension being approximately half the diameter of said bellows section to permit the upper portion of said reservoir section to be grasped between two fingers, the lower surfaces of the fingers resting on the bottom surface of the bottom bellows ring, and (d) a hollow dispensing tube section located laterally adjacent said reservoir section extending downwards from said bellows section, said dispensing tube having the general shape of an inverted hollow U-tube, said U-tube having an upwardly extending inner leg communicating at its lower end in fluid-tight connection with said lower portion of said reservoir section, and a downwardly extending, outer outlet leg having a bore through which fluid may be dispensed, said dispensing tube section being of smaller front-to-rear thickness than the diameter of said bellows section to permit said dispensing tube section to be grasped between two fingers, the lower surfaces of the fingers resting on the bottom surface of the bottom bellows ring, whereby said dispensing container may be transported and operated in one hand.

2. The dispensing container of claim 1 wherein said inner leg of said dispensing tube is longitudinally disposed, adjacent the diametral wall of said semi-cylindrical reservoir section.

3. The dispensing container of claim 1 wherein the front and rear side walls of said upper portion of said reservoir section contain concave depressions adapted to being held between the fingers.

4. The dispensing container of claim 1 wherein said U-shaped dispensing tube is joined to said reservoir section by means of a thin medial web of generally uniform thickness and having generally flat and parallel front and rear side walls.

5. The dispensing container of claim 4 wherein the lower edge of said web below said reservoir section slopes upwards toward the outer side wall of said reservoir section, and then downwards and upwards to form a downwardly protruding tab adapted for engagement by a finger.

6. The dispensing container of claim 1 wherein said outlet leg of said dispensing tube has formed in its outer cylindrical wall surface, some distance above said annular indentation, an annular bead adapted to abut the opposed, gently closed teeth of a patient, thereby limiting the insertion depth of said outlet leg into the mouth of said patient.

7. The dispensing container of claim 6 wherein the transverse cross-sectional shape of said outlet leg of said dispensing tube between said annular indentation and said annular bead is oval, thereby adapting that portion of said outlet leg tube to be held comfortably between opposed teeth of a patient.

8. The dispensing container of claim 1 wherein said dispensing container is a molded one-piece structure.

9. The dispensing container of claim 8 wherein said dispensing container is blow-molded from a thermoplastic material.

10. The dispensing container of claim 1 wherein said bore of said outer, outlet dispensing leg of said dispensing tube is sealed at its lower end by a severable cap.

11. The dispensing container of claim 10 wherein said outer leg of said dispensing tube extends below the reservoir section.

12. The dispensing container of claim 10 wherein said severable cap sealing the lower end of said outer, outlet leg of said dispensing tube is further defined as a generally convex shell joined at an annular indentation to said outer leg of said dispensing tube, said annular indentation adapted to receive the blades of a pair of scissors.

* * * * *